United States Patent
Saito

(10) Patent No.: US 10,259,074 B2
(45) Date of Patent: Apr. 16, 2019

(54) WELDING MODE DETERMINATION DEVICE, METHOD FOR DETERMINING WELDING MODE, AND LASER BEAM WELDING DEVICE

(71) Applicant: PRIMEARTH EV ENERGY CO., LTD., Kosai-shi, Shizuoka (JP)

(72) Inventor: Shigeki Saito, Hamamatsu (JP)

(73) Assignee: PRIMEARTH EV ENERGY CO., LTD., Kosai-Shi (JP)

( * ) Notice: Subject to any disclaimer, the term of this patent is extended or adjusted under 35 U.S.C. 154(b) by 483 days.

(21) Appl. No.: 15/064,349

(22) Filed: Mar. 8, 2016

(65) Prior Publication Data

US 2016/0263700 A1 Sep. 15, 2016

(30) Foreign Application Priority Data

Mar. 11, 2015 (JP) .................................. 2015-048267

(51) Int. Cl.
*B23K 26/03* (2006.01)
*B23K 26/062* (2014.01)
*B23K 103/10* (2006.01)

(52) U.S. Cl.
CPC ........ *B23K 26/032* (2013.01); *B23K 2103/10* (2018.08)

(58) Field of Classification Search
CPC ................................ B23K 26/03; B23K 26/06
USPC ............................ 219/121.62–121.64, 121.83
See application file for complete search history.

(56) References Cited

U.S. PATENT DOCUMENTS 8,890,023 B2 * 11/2014 Dorsch ................ B23K 26/032
219/121.64
2013/0062324 A1 3/2013 Dorsch et al.

FOREIGN PATENT DOCUMENTS

JP 2009-125790 A 6/2009

OTHER PUBLICATIONS

JP Office Action dated Nov. 1, 2017 as received in Application No. 2015-048267 [Machine Translation].

* cited by examiner

*Primary Examiner* — Samuel M Heinrich
(74) *Attorney, Agent, or Firm* — Maschoff Brennan

(57) ABSTRACT

A welding mode determination device that determines a welding mode when laser beam welding is performed includes an obtaining unit that obtains an image in an infrared wavelength region and an image in a short wavelength region of visible light from a laser irradiation area and its vicinity. An extraction unit extracts a light emitting image from the image in the infrared wavelength region and a light emitting image from the image in the short wavelength region of visible light. A determination unit compares the light emitting image of the image in the infrared wavelength region and the light emitting image of the image in the short wavelength region of visible light and determines the welding mode when the laser beam welding is performed based on a comparison result.

15 Claims, 5 Drawing Sheets

Fig.4

| welding mode | first mode (heat conduction welding) | second mode (transition state) | third mode (keyhole welding (satisfactory)) | fourth mode (keyhole welding (many sputters)) |
|---|---|---|---|---|
| diagram of welding action | L2, 350, 300 | L2, 354, 352, 351, 300 | L2, 354, 352, 351, 300, 355, 353 | L2, 354, 352, 351, 300, 355, 353 |
| image captured at 750 nm | 360, 300 | 361, 300 | 362, 300 | 363, 365, 366, 300 |
| image captured at 450 nm | no image | 370, 300 | 371, 300 | 372, 300 |

Fig.5A
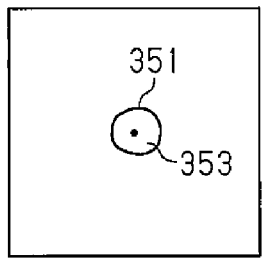

Fig.5B
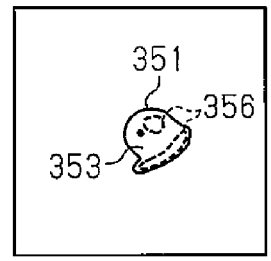

Fig.5C
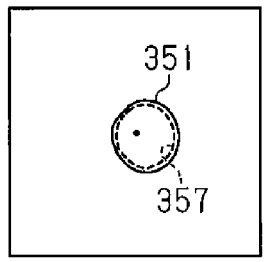

Fig.6

|   |   | first mode | second mode | third mode | fourth mode |
|---|---|---|---|---|---|
|   |   | heat conduction welding | transition state | keyhole welding (satisfactory) | keyhole welding (many sputters) |
| a | size of image at 450 nm relative to image at 750 nm | incomparable | small | slightly small | same |
| b | luminance difference of image at 450 nm and image at 750 nm | incomparable | large | small | small |
| c | luminance (750 nm) | low | low | high | High (uneven) |
| d | luminance (450 nm) | not detected | low | high | high |

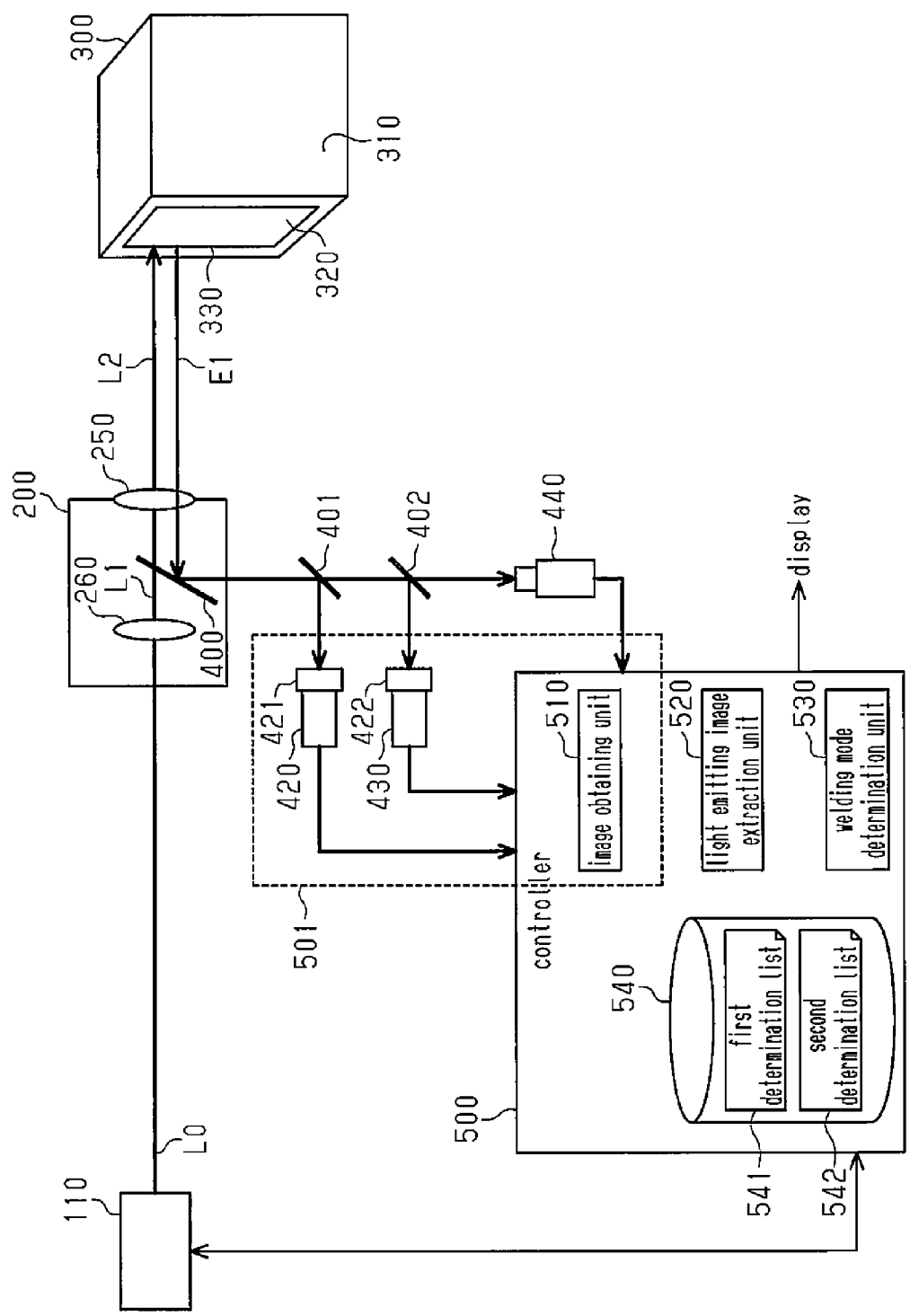

WELDING MODE DETERMINATION DEVICE, METHOD FOR DETERMINING WELDING MODE, AND LASER BEAM WELDING DEVICE

CROSS-REFERENCE TO RELATED APPLICATIONS

This application is based upon and claims the benefit of priority from prior Japanese Patent Application No. 2015-048267, filed on Mar. 11, 2015, the entire contents of which are incorporated herein by reference.

FIELD

The present invention relates to a welding mode determination device capable of determining a welding mode based on a state of welding performed with a laser beam, a method for determining the welding mode, and a laser beam welding device that includes the welding mode determination device.

BACKGROUND

A technique for welding a welded subject by irradiating the welded subject with a laser beam is known in the art. For example, a battery may include a metal cover and a metal case that are welded together through such laser beam welding. The metal cover and the metal case are welded with high accuracy to keep the battery hermetically sealed so that the electrolyte solution or the like does not leak out of the case. To increase the welding accuracy, techniques for monitoring the welding state during welding have been proposed. Japanese Laid-Open Patent Publication No. 2009-125790 describes an example of such a technique in which the welding state is monitored during arc welding.

Japanese Laid-Open Patent Publication No. 2009-125790 describes a welding monitor device that monitors arc welding. The welding monitor device includes two image capturing units that capture images around an arc-welded area, a first band-pass filter that passes wavelengths in the infrared wavelength band and is arranged in one of the image capturing units, and a second band-pass filter that passes wavelengths in the ultraviolet wavelength band and is arranged in the other image capturing unit. The welding monitor device also includes an illumination unit that has a light emission spectrum in the band passing through the second band-pass filter and illuminates the arc-welded area, an image combining unit that combines images captured by the two image capturing units, and an image display unit that displays the image combined by the image combining unit.

SUMMARY

In arc welding, the welding monitor device described in Japanese Laid-Open Patent Publication No. 2009-125790 may accurately capture an image showing the situation (e.g., state of generated arc, state of weld pool) around the arc spot. Additionally, the image corresponding to the situation may be monitored through a monitor.

When performing welding, such as arc welding and laser beam welding, the welding location, which is heated and melted at a high temperature, may be monitored. However, the welding state (welding mode), which drastically changes as time elapses, cannot easily be determined in an objective manner.

One aspect of the present invention is a welding mode determination device that determines a welding mode when laser beam welding is performed. The welding mode determination device includes an obtaining unit, an extraction unit, and a determination unit. The obtaining unit obtains an image in an infrared wavelength region and an image in a short wavelength region of visible light from a laser irradiation area and its vicinity. The extraction unit extracts a light emitting image from the image in the infrared wavelength region and a light emitting image from the image in the short wavelength region of visible light. The determination unit compares the light emitting image of the image in the infrared wavelength region and the light emitting image of the image in the short wavelength region of visible light and determines the welding mode when the laser beam welding is performed based on a comparison result.

Another aspect of the present invention is a method for determining a welding mode when laser beam welding is performed. The method includes obtaining an image in an infrared wavelength region and an image in a short wavelength region of visible light from a laser irradiation area and its vicinity, extracting a light emitting image from the image in the infrared wavelength region and a light emitting image from the image in the short wavelength region of visible light, and determining the welding mode when the laser beam welding is performed by comparing the light emitting image of the image in the infrared wavelength region and the light emitting image of the image in the short wavelength region of visible light.

Another aspect of the present invention is a laser beam welding device that is capable of changing an energy intensity of a laser beam that irradiates a laser irradiation area when performing laser beam welding. The laser beam welding device includes an obtaining unit, an extraction unit, and a controller. The obtaining unit obtains an image in an infrared wavelength region and an image in a short wavelength region of visible light from the laser irradiation area and its vicinity. The extraction unit extracts a light emitting image from the image in the infrared wavelength region and a light emitting image from the image in the short wavelength region of visible light. The controller controls the energy intensity of the laser beam by comparing the light emitting image of the image in the infrared wavelength region and the light emitting image of the image in the short wavelength region of visible light.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 4 is a table showing first to fourth modes, which are the welding modes of the laser beam welding device, with respect to the melting action, images captured at 750 nm, and images captured at 450 nm;

FIGS. 5A to 5C are schematic views showing changes in the welding state during laser beam welding where FIG. 5A shows a state when welding is performed in the third or fourth mode, FIG. 5B shows a state when welding advances, and FIG. 5C shows a state when welding further advances;

FIG. 6 is a table showing the characteristics for the images of 750 nm and the images of 450 nm in the first to fourth modes; and FIG. 7 is a schematic block diagram showing the structure of another embodiment of a laser beam welding device.

DESCRIPTION OF THE EMBODIMENTS

One embodiment of a welding mode determination device, a method for determining a welding mode, and a laser beam welding device will now be described with reference to FIGS. 1 to 6.

Figure 1:
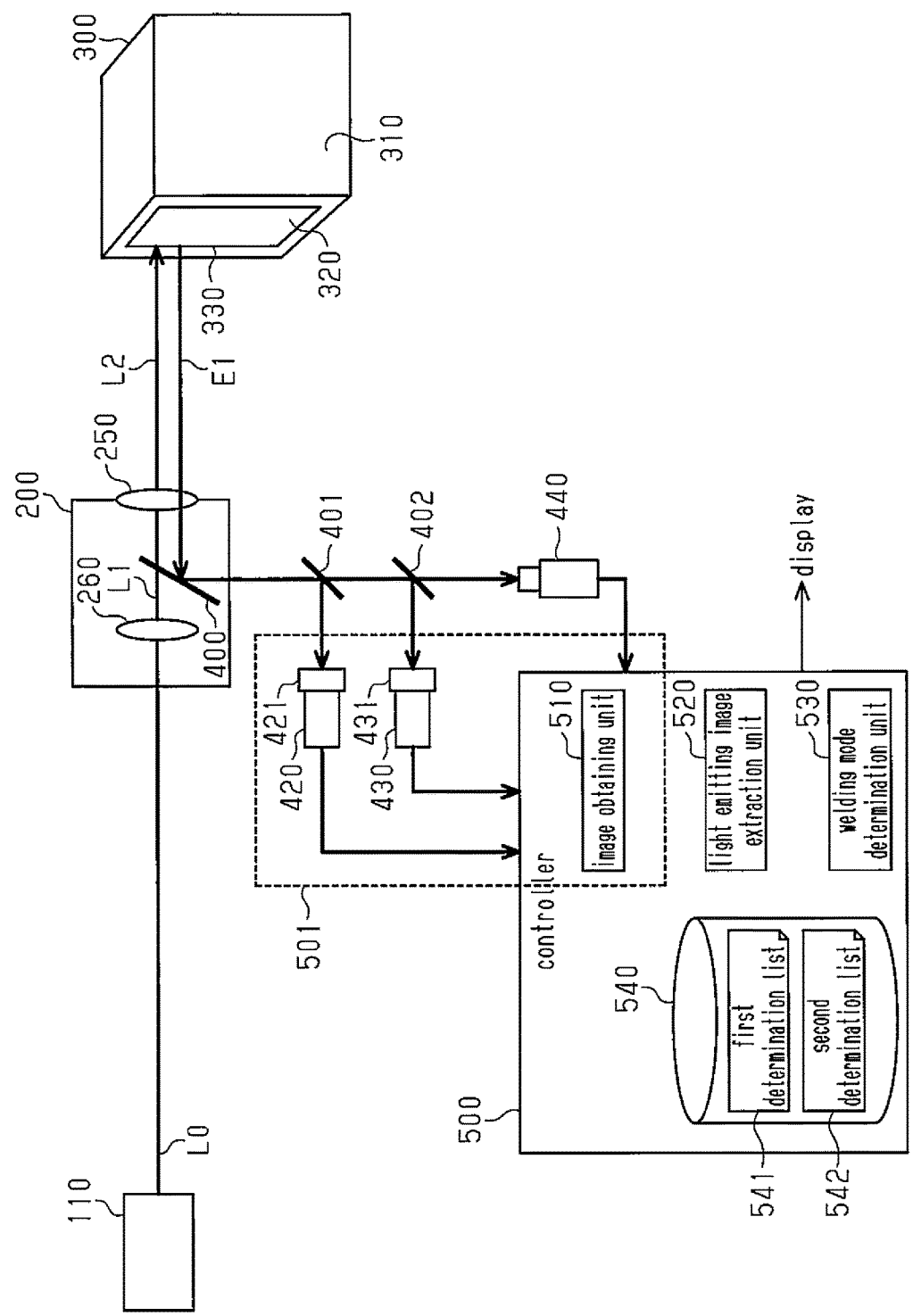
FIG. 1 is a schematic block diagram showing one embodiment of a laser beam welding device.

As shown in FIG. 1, a laser beam welding device irradiates and welds a welded subject with an irradiation laser beam L2, which is generated from an oscillation laser beam L0 output from a laser oscillator 110. The laser beam welding device includes the laser oscillator 110, which oscillates and outputs the laser beam, and a laser output unit 200, which irradiates a welding subject with the oscillation laser beam L0 output from the laser oscillator 110.

The laser oscillator 110 is a semiconductor laser that oscillates a laser diode and outputs the oscillation laser beam L0. The laser oscillator 110 outputs the oscillation laser beam L0 that is applicable to laser beam welding and has a wavelength of, for example, 880 to 980 nanometers (nm). The oscillation laser beam L0, which is output from the laser oscillator 110, has an energy intensity distribution of a top-hat type (near-uniform type). It is easy for the semiconductor laser to output laser beams having the top-hat intensity distribution. This simplifies the configuration of the laser oscillator 110 and reduces the costs.

The laser output unit 200 irradiates the welding subject with a laser beam. The laser output unit 200 generates the irradiation laser beam L2 from the received oscillation laser beam L0 and outputs the irradiation laser beam L2 for irradiation. The laser output unit 200 irradiates a welding subject portion of a battery 300, which is the welded subject, with the irradiation laser beam L2. The battery 300 includes a metal case 310 and a metal cover 320. The portion subject to welding includes a boundary portion 330 of the case 310 and the cover 320. The portion subject to welding is welded with the irradiation laser beam L2 irradiated from the laser output unit 200. In the present embodiment, the metal forming the case 310 and the cover 320 is aluminum or an aluminum alloy.

Figure 2:
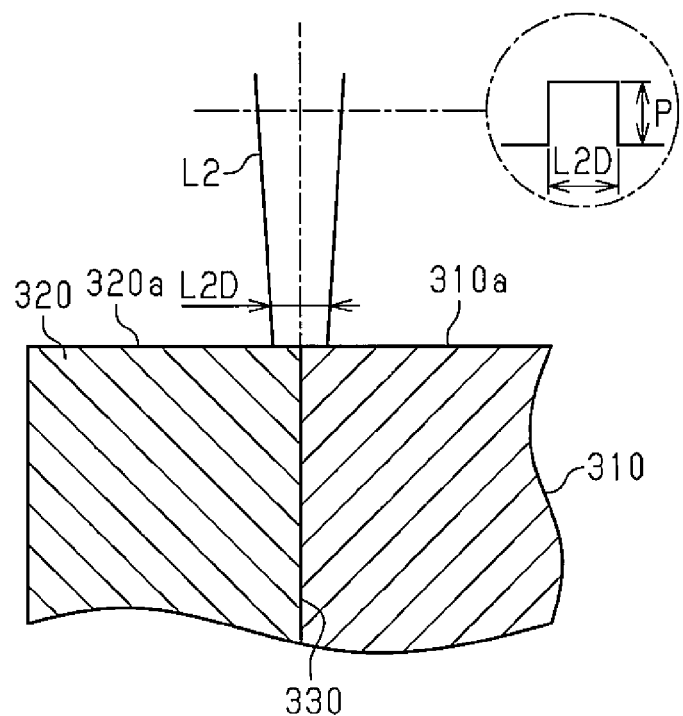
FIG. 2 is a schematic cross-sectional view showing the structure of a laser-welded area by the laser beam welding device.

As shown in FIG. 2, the irradiation laser beam L2 has an irradiation diameter of diameter L2D. Also, the irradiation laser beam L2 has an intensity P distributed in the irradiation diameter in a substantially uniform manner, which is referred to as the top-hat intensity distribution. The irradiation laser beam L2 is emitted to a surface 310a of the case 310 and a surface 320a of the cover 320 so that the boundary portion 330 of the case 310 and the cover 320 is included in the irradiation diameter. When high energy is applied to the welding subject area, the boundary portion 330, which is included in a laser irradiation area, is laser-welded.

Figure 3:
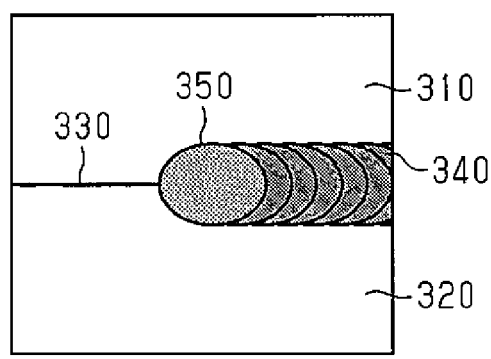
FIG. 3 is a schematic diagram showing a welded portion when welded by the laser beam welding device.

As shown in FIG. 3, movement of the irradiation laser beam L2 relative to the boundary portion 330 of the case 310 and the cover 320 of the battery 300 laser-welds the boundary portion 330 of the case 310 and the cover 320. The high energy, which is applied to the irradiation area of the irradiation laser beam L2, melts the aluminum alloy. The molten aluminum alloy forms a weld pool 350. When the weld pool 350 is outside the irradiation area of the irradiation laser beam L2, the weld pool 350 cools and hardens. This forms a weld mark 340, which is left along the portion that has been welded.

As shown in FIG. 1, the laser output unit 200 includes a collimator lens 260, which receives the oscillation laser beam L0, and a condenser lens 250, which outputs the irradiation laser beam L2.

The collimator lens 260 receives the oscillation laser beam L0 and sends a parallel beam L1 to the condenser lens 250.

The condenser lens 250 outputs the received laser beam so that the laser beam is converged at a predetermined position. The condenser lens 250 receives the parallel beam L1 and outputs the irradiation laser beam L2, which has been converged. The condenser lens 250 decreases the irradiation diameter (diameter L2D) to be smaller than the diameter of the parallel beam L1. This increases the energy intensity of the irradiation laser beam L2 in the irradiation area. Thus, the welding subject portion is irradiated with the irradiation laser beam L2 that has a high energy intensity. This increases the temperature of the welding subject portion and melts the welding subject portion. For example, two metal members of the welded subject are each melt and then welded together.

The laser output unit 200 also includes a spectral unit 400 that receives a beam E1, which is the light directed from the irradiation area of the irradiation laser beam L2 and its vicinity, from the condenser lens 250 and separately outputs the beam E1 and the parallel beam L1. More specifically, the laser output unit 200 receives the beam E1 with the condenser lens 250 from a direction opposite to the traveling direction of the irradiation laser beam L2. The beam E1 includes light that is emitted from the welding subject in correspondence with the temperature or the melting state of the welding subject portion including the weld pool 350. The spectral unit 400 allows the parallel beam L1 to pass through the spectral unit 400 in the traveling direction and reflects the beam E1, which is received from the direction opposite to the traveling direction of the parallel beam L1, in a predetermined direction. For example, the spectral unit 400 deflects the beam E1 by 90°.

When output from the laser output unit 200, the beam E1 is split by a first splitter 401 into a beam directed toward a first image unit 420 and a beam directed toward a second splitter 402. The second splitter 402 further splits the beam into a beam directed toward a second image unit 430 and a beam directed toward a third image unit 440.

The first and second splitters 401, 402, which are the so-called beam splitters, transmit and reflect incident light at a predetermined ratio. The first splitter 401 sends reflection light to the first image unit 420 and transmission light to the second splitter 402. The second splitter 402 sends reflection light to the second image unit 430 and transmission light to the third image unit 440. The first splitter 401 may be set so that the ratio of transmission light to reflection light is, for example, two to one. The second splitter 402 may be set so that the ratio of transmission light to reflection light is, for example, one to one. When the transmission ratio and the reflection ratio of the first and second splitters 401, 402 are set in this manner, the beam reflected by the first splitter 401, the beam reflected by the second splitter 402, and the beam transmitted through the second splitter 402 may each have one third of the intensity of the beam E1. The first splitter 401 and the second splitter 402 may each have any transmission-reflection ratio.

The first and second image units 420, 430 receive the split beam E1 through band-pass filters 421, 431, respectively. The band-pass filters 421, 431 selectively transmit only beams in a predetermined wavelength region.

In the present embodiment, the band-pass filter 421 selectively transmits light in a wavelength region of 400 to 500 nm having a center wavelength of 450 nm. The band-pass filter 421 does not transmit light in other wavelength regions. More specifically, the band-pass filter 421 sends light in the wavelength region from 400 to 500 nm to the first image unit 420. The wavelength from 400 to 500 nm is included in a short wavelength region of visible light and, more specifically, in a wavelength region including wavelengths corresponding to blue and violet. The band-pass filter 421 may selectively transmit light in a wavelength region from 400 to 590 nm. In this case, it is preferred that the first image unit 420 be sensitive to light in a wide range from 400 to 590 nm. A wavelength exceeding 590 nm increases noise such as metal fumes and thus is not preferable. Therefore, the wavelengths are set to be less than or equal to 590 nm. Such noise may be further limited when the wavelength is set to be less than or equal to 500 nm.

Additionally, in the present embodiment, the band-pass filter 431 selectively transmits light in a wavelength region of 700 to 800 nm having a center wavelength of 750 nm. The band-pass filter 431 does not transmit light in other wavelength regions. More specifically, the band-pass filter 431 sends light in the wavelength region from 700 to 800 nm to the second image unit 430. The wavelength from 700 to 800 nm is included in the infrared wavelength region and, more specifically, in a wavelength region categorized into a near-infrared wavelength region. The band-pass filter 431 may selectively transmit light in a wavelength region from 700 to 900 nm. In this case, it is preferred that the second image unit 430 be sensitive to light in a wide range from 700 to 900 nm. A wavelength exceeding 900 nm increases noise of the laser beam and thus is not preferable. Therefore, the wavelengths are set to be less than or equal to 900 nm. Such noise may be further limited when the wavelength is set to be less than or equal to 800 nm.

The first to third image units 420, 430, 440 each include a CCD camera and capture an image of the weld pool 350 as a light emitting image containing the beam E1. The first to third image units 420, 430, 440 provide the captured images to a controller 500.

The first image unit 420 captures an image of light in the wavelength region from 400 to 500 nm, which are selected through the band-pass filter 421. The wavelength from 400 to 500 nm is suitable for, for example, observing the light that is emitted when a molten metal is vaporized (ionized). For example, a material containing aluminum has a vaporization temperature of appropriately 2300° C. to 2500° C. The wavelength region in which the first image unit 420 can capture an image may include any wavelength region as long as the wavelength from 400 to 500 nm is included.

The second image unit 430 captures an image of light in the wavelength region from 700 to 800 nm selected by the band-pass filter 431. The wavelength from 700 to 800 nm is suitable for, for example, observing the light that is emitted from the metal due to melting. For example, a material containing aluminum has a melting temperature of approximately 650° C. to 750° C. The wavelength region in which the second image unit 430 can capture an image may include any wavelength region as long as the wavelength from 700 to 800 nm is included.

The third image unit 440 is provided with an image-capturing wavelength region, which at least includes a visible light wavelength region, and captures an image of light in the image-capturing wavelength region. More specifically, the third image unit 440 captures an image of the weld pool 350 and its vicinity. The image is mainly formed from the visible light.

The controller 500 is connected to the first to third image units 420, 430, 440. The controller 500 receives captured images from the first to third image units 420, 430, 440. The controller 500 includes an image obtaining unit 510, which obtains a captured image, a light emitting image extraction unit 520, which extracts a light emitting image corresponding to the melting state from the captured image, and a welding mode determination unit 530, which determines the welding mode. The controller 500 also includes a memory 540, which stores data needed for determining the welding mode. The memory 540 stores a first determination list 541 and a second determination list 542, which are used for determining the welding mode. In the present embodiment, an obtaining unit 501 (obtaining step) includes the first image unit 420, the second image unit 430, and the image obtaining unit 510.

The controller 500 transmits a determined welding mode to a display or the like. Then, the determined welding mode is output on the display or the like.

The image obtaining unit 510 obtains a captured image from the first image unit 420 and a captured image from the second image unit 430.

The light emitting image extraction unit 520 extracts a light emitting image (e.g., refer to light emitting images 360 to 363 in FIG. 4) from the captured image provided from each of the first and second image units 420, 430 (extraction step). The light emitting image is an image showing a range of light emitted when the welding subject is molten through the laser beam welding. In the present embodiment, an image of the laser irradiation area and its vicinity is captured when an alloy of aluminum is heated and molten or vaporized by the energy of the laser beam. When aluminum alloy is irradiated with the laser beam, the energy is diffused from the laser irradiation area. Thus, the intensity of the applied energy is the same within a circular range extending around the laser irradiation area. This forms the circular weld pool 350 and circular light emitted from the molten metal.

The welding mode determination unit 530 compares the light emitting image in the short wavelength region of visible light and the light emitting image in the infrared wavelength region, which are extracted through the light emitting image extraction unit 520. Then, the welding mode determination unit 530 compares the comparison result with the first and second determination lists 541, 542 and determines the welding mode (determination step).

The memory 540 is a non-volatile memory such as a hard disk or a flash memory. The memory 540 stores various kinds of data needed for determining the welding mode in advance.

As shown in FIG. 4, in the present embodiment, there are four welding modes, namely, first to fourth modes. The first mode corresponds to heat conduction welding. The second mode corresponds to a transition state between the heat conduction welding and keyhole welding. The third mode corresponds to satisfactory keyhole welding. The fourth mode corresponds to keyhole welding that is full of sputters.

The relationship of the welding modes and welding phenomena will now be described with reference to the table showing the melting action in FIG. 4.

The first mode corresponds to heat conduction welding. The welding subject portion of the battery 300 is irradiated and heated with the irradiation laser beam L2. The heat diffuses to a predetermined range of the material and melts the predetermined range of the material. This forms the weld pool 350.

The second mode corresponds to the transition state. For example, continuous irradiation of the welding subject portion with the irradiation laser beam L2 results in the first mode changing to the transition state. In the transition state, the weld pool 350 is changed to a weld pool 351 in which convection occurs in the material of the weld pool 350 that is molten due to the irradiation with the irradiation laser beam L2. The weld pool 351 includes a surface layer 352. A portion of the material in the surface layer 352 is vaporized and becomes a bloom 354. The bloom 354 is discharged above the weld pool 351. In the weld pool 351, heat is efficiently conducted to a bottom surface of the weld pool 351 due to the convection. Thus, the weld pool 351 gradually becomes deeper as the material is molten in the bottom surface.

The third mode corresponds to the satisfactory keyhole welding. For example, continuous irradiation of the welding subject portion with the irradiation laser beam L2 results in the second mode changing to the satisfactory keyhole welding. More specifically, the weld pool 351, in which the convection of the material occurs, has high energy. This actively vaporizes a portion of the surface layer 352. The active vaporization forms a keyhole 353, which is a recess, in the surface layer 352. Additionally, many blooms 354 are discharged above the weld pool 351 due to the active vaporization. Further, metal grains forming the material, or sputters 355, are discharged due to the active vaporization. This further recesses the surface layer 352. Consequently, the bottom surface of the weld pool 351 is lowered, and the weld pool 351 becomes further deeper.

The fourth mode corresponds to keyhole welding that discharges many sputters. For example, further continuous irradiation of the welding subject portion with the irradiation laser beam L2 results in the third mode changing to the keyhole welding that discharges many sputters. More specifically, when the energy is further increased in the weld pool 351, in which the convection of the material occurs, a portion of the surface layer 352 is vigorously vaporized. The vigorous vaporization forms the keyhole 353, which is further deeply recessed in the surface layer 352. Additionally, more blooms 354 are discharged above the weld pool 351 due to the vigorous vaporization. Further, many sputters 355 are discharged due to the vigorous vaporization. This further recesses the surface layer 352. Consequently, the bottom surface of the weld pool 351 is further lowered, and the weld pool 351 becomes further deeper.

FIG. 5 shows states when the weld pool 351, in which the convection of the material occurs, is continuously irradiated with the irradiation laser beam L2 in the fourth mode. When the weld pool 351 is continuously irradiated with the irradiation laser beam L2 in the fourth mode (refer to FIG. 5A), an abnormal portion 356, which has an abnormal welding state, is formed in the weld pool 351 (refer to FIG. 5B). Then, as shown in FIG. 5C, a through hole 357 is formed. In the battery 300 of the present embodiment, it is not preferred that the abnormal portion 356 and the through hole 357 are formed in the welding subject portion of the case 310 and the cover 320.

More specifically, in laser beam welding, when the keyhole 353 is formed, for example, as shown in the third mode or the fourth mode, deep welding is performed on the material. However, the case 310 and the cover 320 of the battery 300 are thin. Thus, the deep keyhole 353 may form the through hole 357 in the case 310 and the cover 320. It is also not preferred that many sputters 355 are sputtered during welding. Particularly, in the battery 300, the increased number of the sputters 355 requires more tasks for preventing the sputters 355 from entering the battery 300 to avoid internal short-circuiting. In the first mode, shallow welding is performed on the material. This may fail to obtain appropriate strength and safety when welding the case 310 and the cover 320. In this regard, in the present embodiment, the second mode is set to be the suitable welding mode for welding the case 310 and the cover 320. For example, one may be informed of whether or not the welding mode is the second mode or one may be allowed to subsequently check whether or not the welding mode was the second mode.

The images captured in each welding mode in the infrared wavelength region and in the short wavelength region of visible light will now be described with reference to FIG. 4. In the following description, the term "substantially the same" may be used when comparing the size of the light emitting images and the luminance. Here, the term "substantially the same" refers to being the same and also includes differences to a certain extent taking into consideration errors or the like.

The images in the infrared wavelength region will now be described. The images are captured in the wavelength region from 700 to 800 nm having the center wavelength of 750 nm. In the present embodiment, the infrared wavelength region includes the wavelength region from 700 to 800 nm. As described above, the wavelength region from 700 to 800 nm is suitable for observing the light emitted from the molten metal. More specifically, the range in which the metal is molten, or the size of the weld pool 350, may be observed based on the image in this wavelength region.

The light emitting images 360 to 363 are obtained from the images in the infrared wavelength region corresponding to the first to fourth modes. The light emitting images 360 to 363 are each circular and extend around the area irradiated with the irradiation laser beam L2. The light emitting image 360 of the first mode has low luminance. The light emitting image 361 of the second mode also has low luminance. The light emitting images 360, 361 have substantially the same size (diameter or area). The light emitting images 362, 363 of the third and fourth modes have a larger size (diameter or area) and a higher luminance than the light emitting images 360, 361 of the first and second modes. The light emitting images 362, 363 have substantially the same size (diameter or area). The light emitting image 363 of the fourth mode includes a high luminance portion 365 and a low luminance portion 366 and thus has uneven luminance. The high luminance portion 365 and the light emitting image 362 of the third mode have substantially the same luminance.

The images in the short wavelength region of visible light will now be described. The images are captured in the wavelength region from 400 to 500 nm having the center wavelength of 450 nm. In the present embodiment, the short wavelength region of visible light includes the wavelength from 400 to 500 nm. As described above, the wavelength region from 400 to 500 nm is suitable for observing the light emitted when the molten metal is vaporized (ionized). More specifically, based on the images in this wavelength region, the degree of the metal vaporization may be observed. Additionally, the depth of the keyhole 353 formed in the weld pool 350 may be estimated.

Light emitting images 370 to 372 are obtained from the images in the short wavelength region of visible light corresponding to the second to fourth modes. In the first mode, a light emitting image cannot be captured. The light emitting images 370 to 372 are each circular and have the center on the area irradiated with the irradiation laser beam L2. The light emitting image 370 of the second mode has low luminance and is small in size (diameter or area). The light emitting images 371, 372 of the third and fourth modes are larger in size (diameter or area) and have higher luminance than the light emitting image 370 of the second mode. The light emitting images 371, 372 have substantially the same luminance. However, the light emitting image 371 of the third mode is smaller in size (diameter or area) than the light emitting image 372 of the fourth mode.

The light emitting images in each wavelength region have characteristics corresponding to each welding mode. However, the accuracy for determining the welding mode cannot be easily maintained at a high level just by comparing the light emitting images in a single wavelength region. In this regard, in the present embodiment, the welding mode can be determined with high accuracy based on the comparison between the image in the infrared wavelength region and the image in the short wavelength region of visible light. Thus, the welding mode is determined by comparing the light emitting image in one wavelength region relative to the light emitting image in the other wavelength region, which serves as the reference. Even in the same welding mode, the luminance and the size may vary in accordance with conditions such as the intensity of the laser beam. Even in such a case, a comparison based on one of the light emitting images under the same condition may be performed to reduce the conditional effect and allow for further accurate determination.

More specifically, as shown in FIG. 1, the first determination list 541 and the second determination list 542 are provided. Hereafter, for the sake of brevity, the light emitting image in the short wavelength region of visible light (wavelength region including 450 nm) may be referred to as the "light emitting image of 450 nm," and the light emitting image in the infrared wavelength region (wavelength region including 750 nm) may be referred to as the "light emitting image of 750 nm."

The first determination list 541 is used when determining the welding mode based on the size comparison result between the light emitting image in the short wavelength region of visible light and the light emitting image in the infrared wavelength region.

More specifically, as shown in row "a" in FIG. 6, the first determination list 541 specifies the welding mode based on the difference in the size (e.g., diameter) of the light emitting image of 450 nm relative to the light emitting image of 750 nm. More specifically, the first mode is determined when the images are incomparable because the light emitting image of 450 nm cannot be captured. The second mode is determined when the light emitting image of 450 nm is "small" relative to the light emitting image of 750 nm. Here, the term "small" indicates that, for example, the diameter of the light emitting image of 450 nm is less than one-half of the diameter of the light emitting image of 750 nm. The third mode is determined when the light emitting image of 450 nm is smaller than the light emitting image of 750 nm but greater than the range of the second mode, that is, "slightly small." Here, the term "slightly small" indicates that, for example, the diameter of the light emitting image of 450 nm is smaller than the diameter of the light emitting image of 750 nm and greater than or equal to one-half of the diameter of the light emitting image of 750 nm. The fourth mode is determined when the light emitting image of 450 nm and the light emitting image of 750 nm have substantially the same size.

In this manner, the welding mode may be selected from the four modes based on the size difference between the light emitting image in the short wavelength region of visible light and the light emitting image in the infrared wavelength region.

The second determination list 542 is used to determine the welding mode based on the luminance comparison result between the light emitting image in the short wavelength region of visible light and the light emitting image in the infrared wavelength region.

More specifically, as shown in row "b" in FIG. 6, the second determination list 542 is configured so that the welding mode can be specified based on the luminance difference between the light emitting image of 750 nm and the light emitting image of 450 nm, or the difference in the luminance of the light emitting image of 750 nm relative to the light emitting image of 450 nm. More specifically, the first mode is determined when the images are incomparable because the light emitting image of 450 nm has no luminance. The second mode is determined when the luminance of the light emitting image of 750 nm is high relative to the luminance of the light emitting image of 450 nm. The third mode and the fourth mode are distinguished based on whether or not the light emitting image of 750 nm includes a high luminance portion and a low luminance portion, that is, "uneven luminance." The third mode is determined when there is no "uneven luminance." The fourth mode is determined when there is "uneven luminance." The third mode is determined when there is no "uneven luminance" and the luminance of the light emitting image of 450 nm and the luminance of the light emitting image of 750 nm are relatively proximate to each other. The fourth mode is determined when there is "uneven luminance" and the luminance of the light emitting image of 450 nm and the luminance of the high luminance portion of the light emitting image of 750 nm are relatively proximate to each other.

In this manner, the welding mode may be selected from the four modes based on the luminance difference between the light emitting image in the short wavelength region of visible light and the light emitting image in the infrared wavelength region.

The second determination list 542 is also used to determine the welding mode based on the combination of the luminance of the light emitting image in the short wavelength region of visible light and the luminance of the light emitting image in the infrared wavelength region.

More specifically, the welding mode can be specified based on the combination of the luminance of the light emitting image of 750 nm (shown in row "c" in FIG. 6) and the luminance of the light emitting image of 450 nm (shown in row "d" in FIG. 6). More specifically, the first mode is determined when the luminance of the light emitting image of 750 nm is "low" and the luminance of the light emitting image of 450 nm is not detected, that is, the light emitting image of 450 nm has no luminance. The second mode is determined when the luminance of the light emitting image of 750 nm is "low" and the luminance of the light emitting image of 450 nm is "low." The third mode and the fourth mode are distinguished based on whether or not there is "uneven luminance" in the light emitting image of 750 nm. The third mode is determined when there is no "uneven luminance." The fourth mode is determined when there is "uneven luminance." The third mode is determined when there is no "uneven luminance," the luminance of the light emitting image of 750 nm is "high," and the luminance of the light emitting image of 450 nm is "high." The fourth mode is determined when there is "uneven luminance," the luminance of the light emitting image of 750 nm is "high," and the luminance of the light emitting image of 450 nm is "high." The high luminance is determined based on the luminance when the material radiates most during laser beam welding. The low luminance is any luminance that is less than one-half of the high luminance.

In this manner, the welding mode may be selected from the four modes based on the combination of the luminance of the light emitting image in the short wavelength region of visible light and the luminance of the light emitting image in the infrared wavelength region.

The welding mode determination unit 530 determines the welding mode based on at least one of the first determination list 541 and the second determination list 542. That is, the welding mode determination unit 530 may determine the welding mode based on only one of the first determination list 541 and the second determination list 542. In this case, when the welding mode cannot be determined based on one of the determination lists, the other determination list may be used.

When using the second determination list 542, the welding mode determination unit 530 determines the welding mode based on at least one of the conditions, that is, the luminance difference and the luminance combination. That is, the welding mode determination unit 530 may determine the welding mode based on only one of the luminance difference and the luminance combination. In this case, when the welding mode cannot be determined based on one of the conditions, the other condition may be used.

The present embodiment provides a welding mode determination device that objectively determines a welding mode, a method for determining the welding mode, and a laser beam welding device that includes the welding mode determination device.

When the case 310 and the cover 320 of the battery 300 is formed by an aluminum plate having a thickness of 1 mm or less, welding is performed in the appropriate welding mode. This ensures the strength and the hermetic seal of the battery 300 and maintains the reliability. Particularly, when an in-vehicle battery, which may be subjected to vibration, contact, friction, and repetitive thermal loads, is welded in the appropriate welding mode, the strength and the reliability will be maintained at a high level.

Accordingly, the welding mode determination device, the method for determining the welding mode, and the laser beam welding device of the present embodiment have the advantages described below.

(1) When heated, the laser irradiation area changes in state and emits light in correspondence with the state change. In the present embodiment, the light emitting image in the infrared wavelength region is compared with the light emitting image in the short wavelength region of visible light. Thus, the state detected in the infrared wavelength region is compared with the state detected in the short wavelength region of visible light. This comparison allows for objective determination of the welding mode.

Particularly, as shown in rows "a" and "b" in FIG. 6, when the welding mode is determined by comparing two light emitting images, one of the light emitting images may be compared relative to the other light emitting image, which serve as the reference. When the welding mode is determined based on one light emitting image (refer to rows "c" or "b" in FIG. 6), the luminance and the size may vary in accordance with the conditions such as the intensity of the laser beam even in the same welding mode. In this regard, the comparison based on one of the light emitting images under the same condition may be performed to reduce the conditional effect and allows for further accurate determination.

(2) The state specifying the welding mode is obtained from at least one of the size comparison and the luminance comparison between the light emitting image in the infrared wavelength region and the light emitting image in the short wavelength region of visible light.

(3) The welding mode is determined based on the difference obtained by comparing the two light emitting images in size (diameter or area) or luminance. Such comparisons are easy.

(4) The welding mode is easily determined by comparing the size (diameter or area) difference and the luminance difference with the corresponding one of the first and second determination lists 541, 542.

(5) The welding mode is selected from the four modes based on the size (diameter or area) difference between the light emitting image in the short wavelength region of visible light and the light emitting image in the infrared wavelength region. This allows for determination of the appropriate welding mode.

(6) The welding mode is selected from the four modes based on the luminance difference between the light emitting image in the short wavelength region of visible light and the light emitting image in the infrared wavelength region. This allows for determination of the appropriate welding mode.

(7) The welding mode is also selected from the four modes based on the combination of the luminance of the light emitting image in the short wavelength region of visible light and the luminance of the light emitting image in the infrared wavelength region. This allows for determination of the appropriate welding mode.

Other Embodiments

It should be apparent to those skilled in the art that the present invention may be embodied in many other specific forms without departing from the scope of the invention. Particularly, it should be understood that the present invention may be embodied in the following forms.

In the above embodiment, the controller 500 outputs the welding mode on the display. Instead, in the laser beam welding device, the controller 500 may perform feedback control on the output of the laser beam based on the welding state so that the welding is performed in the predetermined welding mode.

As shown in FIG. 7, for example, the laser oscillator 110 is configured to be capable of adjusting an output. The controller 500 is configured to be capable of adjusting the output of the laser oscillator 110. The controller 500 is also configured to perform feedback control so that the welding mode is maintained in the second mode. In one example, when the welding mode is changed from the second mode to the third mode, the controller 500 adjusts the output of the laser oscillator 110 to be decreased. This decreases energy applied to the welding subject portion and changes the welding mode back to the second mode. In another example, when the welding mode is changed from the second mode to the first mode, the controller 500 adjusts the output of the laser oscillator 110 to be increased. This increases the energy applied to the welding subject portion and changes the welding mode back to the second mode. More specifically, the welding mode for the laser irradiation area can be maintained in the target mode by determining the dynamically changing welding mode and controlling the energy intensity of the emitted laser beam.

Consequently, the laser beam welding may be appropriately performed while maintaining the welding mode in the desired mode.

In this embodiment, the controller 500 adjusts the output of the laser oscillator 110. However, the controller may adjust energy applied to the welding subject portion with any means as long as the energy can be adjusted. For example, the optical system of the laser output unit 200 or the distance to the battery 300 may be controlled. This changes the range irradiated with the laser beam and adjusts the energy amount. Additionally, the relative speed between the laser output portion 200 and the battery 300 may be controlled. This changes the relative speed of the laser beam and adjusts the energy amount. More specifically, the welding mode is maintained or changed by adjusting the amount of energy applied to the laser irradiation area.

In the above embodiment, the first and second splitter 401, 402 are beam splitters. Instead, the first and second splitters may each reflect only the light in the selected wavelength region. In this case, the first splitter only needs to reflect the light in the wavelength region from 400 to 500 nm. The second splitter only needs to reflect the light in the wavelength region from 700 to 800 nm. This maintains the intensity of the light in the non-reflected wavelength region at a high level. Although it is preferred that the first splitter reflect the light in the wavelength region from 400 to 500 nm, the wavelength region may be extended to a wavelength region from 400 to 590 nm. Although it is preferred that the second splitter reflect the light in the wavelength region from 700 to 800 nm, the wavelength region may be extended to a wavelength region from 700 to 900 nm.

In the above configuration, the oscillation laser beam L0 may be output from a laser other than the semiconductor laser, for example, a YAG laser, which outputs a high luminance laser beam.

In the above embodiment, the appropriate welding mode for welding the case 310 and the cover 320 is set to the second mode. Instead, the appropriate welding mode may be set to the first mode, the third mode, or the fourth mode in accordance with various conditions such as the kind of the material, the thickness of the material, and the required welding depth.

In the above embodiment, the welding mode is determined in the first to fourth modes based on the combination of the luminance of the light emitting image of 450 nm and the luminance of the light emitting image of 750 nm. Instead, the welding mode may be determined in one, two, or three of the first to fourth modes based on the combination of the luminance of the light emitting image of 450 nm and the luminance of the light emitting image of 750 nm.

In the above embodiment, the welding mode is determined in the first to fourth modes based on the luminance difference between the light emitting image of 450 nm and the light emitting image of 750 nm. Instead, the welding mode may be determined in one, two, or three of the first to fourth modes based on the luminance difference between the light emitting image of 450 nm and the light emitting image of 750 nm.

In the above embodiment, in the first determination list, the term "small" means that the size (e.g., diameter) of the light emitting image of 450 nm is less than one-half of the size (e.g., diameter) of the light emitting image of 750 nm. The term "slightly small" means that the size (e.g., diameter) of the light emitting image of 450 nm is smaller than the size (e.g., diameter) of the light emitting image of 750 nm and greater than or equal to one-half of the size (e.g., diameter) of the light emitting image of 750 nm. However, "small" and "slightly small" may be separated with any value as long as the welding modes are appropriately separated. The value may be greater or less than one-half of the size of the light emitting image of 750 nm. For example, when the "small" range is set so that the diameter of the light emitting image of 450 nm is less than one-third of the diameter of the light emitting image of 750 nm, the "slightly small" range may be set so that the diameter of the light emitting image of 450 nm is greater than or equal to one-third and less than two-thirds of the diameter of the light emitting image of 750 nm. The "same" range may be set so that, for example, the diameter of the light emitting image of 450 nm is greater than or equal to two-thirds of the diameter of the light emitting image of 750 nm.

In the embodiment, the welding mode is determined in the first to fourth modes based on the size difference between the light emitting image of 450 nm and the light emitting image of 750 nm. Instead, the welding mode may be determined in one, two, or three of the first to fourth modes based on the size difference between the two light emitting images.

In the embodiment, the welding mode is determined in the first to fourth modes based on any one of the size difference between the light emitting image of 450 nm and the light emitting image of 750 nm, the luminance difference between the light emitting image of 450 nm and the light emitting image of 750 nm, and the combination of the luminance of the light emitting image of 450 nm and the luminance of the light emitting image of 750 nm. In this case, the range of the welding mode determined based on the size difference, the range of the welding mode determined based on the luminance difference, and the range of the welding mode determined based on the luminance combination do not have to have a conformable boundary as long as portions (e.g., one-half or more) of the ranges overlap. It can be assumed that the welding mode somewhat deviates when determined based on the indexes.

In the embodiment, the welding mode includes the four modes, namely, the first to fourth modes. However, the welding mode may include two, three, or five or more modes as long as necessary welding modes can be specified.

In the first and second determination lists 541, 542 of the embodiment, the light emitting image of 450 nm and the light emitting image of 750 nm are compared to obtain the size (diameter) difference and the luminance difference between the two light emitting images. Instead, the light emitting image of 450 nm and the light emitting image of 750 nm may be compared to obtain the difference in area or perimeter, which indicates the size, or amount of light (luminance×area).

In the embodiment, the irradiation laser beam L2 has the top-hat energy intensity distribution. Instead, the energy intensity distribution of the laser beam may be other than a top-hat type, for example, a Gaussian type. When a Gaussian-type laser beam is used, the irradiation range is narrowed and the energy may be easily concentrated. This shortens the time of laser beam welding, for example, by shorting the time required to form a keyhole.

In the embodiment, the obtaining unit 501 includes the first image unit 420, the second image unit 430, and the image obtaining unit 510. However, the obtaining unit does not have to include image units or may include only one image unit as long as an image of the short wavelength region of visible light and an image of the infrared wavelength region can be obtained from captured images. Alternatively, the obtaining unit may include three or more image units.

In the embodiment, the case 310 and the cover 320 are formed from aluminum (including alloy of aluminum). Instead, the case and the cover may be formed from a metal material other than aluminum such as iron, copper, or stainless steel. Such a metal material only needs to be able to be used as a receptacle and laser-welded. In this case, the welding mode may be determined based on an image captured in a wavelength region corresponding to light emission (radiation) due to the molten metal and an image captured in a wavelength region corresponding to light emission (radiation) due to the metal vaporization. This increases the degree of freedom for designing the case and the cover of the battery.

In the embodiment, the case 310 and the cover 320 of the battery 300 are welded. However, the laser beam welding subject may be other than the battery receptacle as long as laser beam welding is necessary. Additionally, the laser beam welding subject may be other than a receptacle.

The present examples and embodiments are to be considered as illustrative and not restrictive, and the invention is not to be limited to the details given herein, but may be modified within the scope and equivalence of the appended claims.

The invention claimed is:

1. A welding mode determination device that determines a welding mode when laser beam welding is performed, the welding mode determination device comprising:
   an obtaining unit that obtains an image in an infrared wavelength region and an image in a short wavelength region of visible light from a laser irradiation area and its vicinity;
   an extraction unit that extracts a light emitting image from the image in the infrared wavelength region and a light emitting image from the image in the short wavelength region of visible light; and
   a determination unit that compares the light emitting image of the image in the infrared wavelength region and the light emitting image of the image in the short wavelength region of visible light and determines the welding mode when the laser beam welding is performed based on a comparison result,
   wherein the comparison of the light emitting image of the image in the infrared wavelength region and the light emitting image of the image in the short wavelength region of visible light includes at least one of:
      comparing the light emitting image of the image in the infrared wavelength region and the light emitting image of the image in the short wavelength region of visible light in size, and
      comparing the light emitting image of the image in the infrared wavelength region and the light emitting image of the image in the short wavelength region of visible light in luminance,
   wherein:
      the size comparison includes calculating a size difference of the light emitting image of the image in the infrared wavelength region and the light emitting image of the image in the short wavelength region of visible light, and
      the luminance comparison includes calculating a luminance difference of the light emitting image of the image in the infrared wavelength region and the light emitting image of the image in the short wavelength region of visible light,
   the welding mode determination device further comprising:
      a first determination list used to determine the welding mode based on the size difference; and
      a second determination list used to determine the welding mode based on the luminance difference,
   wherein the determination unit refers to at least one of the first determination list and the second determination list to determine the welding mode.

2. The welding mode determination device according to claim 1, wherein
   the size comparison includes calculating a size difference of the light emitting image of the image in the infrared wavelength region and the light emitting image of the image in the short wavelength region of visible light, and
   the determination unit determines the welding mode in accordance with the size difference of the light emitting image of the image in the infrared wavelength region and the light emitting image of the image in the short wavelength region of visible light.

3. The welding mode determination device according to claim 1, wherein
   the luminance comparison includes calculating a luminance difference of the light emitting image of the image in the infrared wavelength region and the light emitting image of the image in the short wavelength region of visible light, and
   the determination unit determines the welding mode in accordance with the luminance difference of the light emitting image of the image in the infrared wavelength region and the light emitting image of the image in the short wavelength region of visible light.

4. A welding mode determination device that determines a welding mode when laser beam welding is performed, the welding mode determination device comprising:
   an obtaining unit that obtains an image in an infrared wavelength region and an image in a short wavelength region of visible light from a laser irradiation area and its vicinity;
   an extraction unit that extracts a light emitting image from the image in the infrared wavelength region and a light emitting image from the image in the short wavelength region of visible light and
   a determination unit that compares the light emitting image of the image in the infrared wavelength region and the light emitting image of the image in the short wavelength region of visible light and determines the welding mode when the laser beam welding is performed based on a comparison result,
   wherein the comparison of the light emitting image of the image in the infrared wavelength region and the light emitting image of the image in the short wavelength region of visible light includes at least one of:
      comparing the light emitting image of the image in the infrared wavelength region and the light emitting image of the image in the short wavelength region of visible light in size, and
      comparing the light emitting image of the image in the infrared wavelength region and the light emitting image of the image in the short wavelength region of visible light in luminance,
   wherein:
      the luminance comparison includes determining a combination of luminance of the light emitting image of the image in the infrared wavelength region and luminance of the light emitting image of the image in the short wavelength region of visible light, and
      the determination unit determines the welding mode in accordance with the combination of the luminance of the light emitting image of the image in the infrared wavelength region and the luminance of the light emitting image of the image in the short wavelength region of visible light.

5. The welding mode determination device according to claim 1, wherein the first determination list includes data used to determine that the welding mode is one of
- a mode in which the light emitting image in the short wavelength region of visible light is not captured,
- a mode in the light emitting image in the short wavelength region of visible light has substantially the same size as the light emitting image in the infrared wavelength region,
- a mode in which the light emitting image in the short wavelength region of visible light has substantially the same size as or is smaller in size than the light emitting image in the infrared wavelength region, and the light emitting image in the short wavelength region of visible light is smaller than a first predetermined size, and
- a mode in which the size of the light emitting image in the short wavelength region of visible light is between the first predetermined size and a second predetermined size that is larger than the first predetermined size.

6. The welding mode determination device according to claim 1, wherein
the first determination list includes data used to categorize the welding mode into
- a mode in which the light emitting image in the short wavelength region of visible light is not captured,
- a mode in which the light emitting image in the short wavelength region of visible light has substantially the same size as the light emitting image in the infrared wavelength region,
- a mode in which the light emitting image in the short wavelength region of visible light has substantially the same size as or is smaller in size than the light emitting image in the infrared wavelength region, and the size of the light emitting image in the short wavelength region of visible light is smaller than a first predetermined size, and
- a mode in which the size of the light emitting image in the short wavelength region of visible light is between the first predetermined size and a second predetermined size that is larger than the first predetermined size, and the determination unit compares the comparison result with the first determination list to determine the welding mode from one of the modes categorized in the first determination list.

7. The welding mode determination device according to claim 1, wherein the second determination list includes data used to determine that the welding mode is one of
- a mode in which the light emitting image in the short wavelength region of visible light has no luminance,
- a mode in which the light emitting image in the infrared wavelength region has uneven luminance and the difference in luminance is small between the light emitting image in the short wavelength region of visible light and a high luminance portion of the light emitting image in the infrared wavelength region,
- a mode in which the light emitting image in the infrared wavelength region does not have uneven luminance and the difference in luminance is small between the light emitting image in the short wavelength region of visible light and the light emitting image in the infrared wavelength region, and
- a mode in which the light emitting image in the short wavelength region of visible light has a higher luminance than the light emitting image in the infrared wavelength region.

8. The welding mode determination device according to claim 1, wherein
the second determination list includes data used to categorize the welding mode into
- a mode in which the light emitting image in the short wavelength region of visible light has no luminance,
- a mode in which the light emitting image in the infrared wavelength region has uneven luminance and the difference in luminance is small between the light emitting image in the short wavelength region of visible light and a high luminance portion of the light emitting image in the infrared wavelength region,
- a mode in which the light emitting image in the infrared wavelength region does not have uneven luminance and the difference in luminance is small between the light emitting image in the short wavelength region of visible light and the light emitting image in the infrared wavelength region, and
- a mode in which the light emitting image in the short wavelength region of visible light has a higher luminance than the light emitting image in the infrared wavelength region, and the determination unit compares the comparison result with the second determination list to determine the welding mode from one of the modes categorized in the second determination list.

9. The welding mode determination device according to claim 7, wherein the second determination list further includes data used to determine that the welding mode is one of
- a mode in which the light emitting image in the short wavelength region of visible light has no luminance and the light emitting image in the infrared wavelength region has luminance,
- a mode in which the light emitting image in the infrared wavelength region has uneven luminance, the light emitting image in the short wavelength region of visible light has a high luminance, and the high luminance portion of the light emitting image in the infrared wavelength region has a high luminance,
- a mode in which the light emitting image in the infrared wavelength region does not have uneven luminance, the light emitting image in the short wavelength region of visible light has a high luminance, and the light emitting image in the infrared wavelength region has a high luminance, and
- a mode in which the light emitting image in the short wavelength region of visible light has a low luminance, and the light emitting image in the infrared wavelength region has a low luminance.

10. The welding mode determination device according to claim 8, wherein the second determination list further includes data used to categorize the welding mode into
- a mode in which the light emitting image in the short wavelength region of visible light has no luminance and the light emitting image in the infrared wavelength region has luminance,
- a mode in which the light emitting image in the infrared wavelength region has uneven luminance, the light emitting image in the short wavelength region of visible light has a high luminance, and the high luminance portion of the light emitting image in the infrared wavelength region has a high luminance,
- a mode in which the light emitting image in the infrared wavelength region does not have uneven luminance, the light emitting image in the short wavelength region of visible light has a high luminance, and the light emitting image in the infrared wavelength region has a high luminance, and
a mode in which the light emitting image in the short wavelength region of visible light has a low luminance, and the light emitting image in the infrared wavelength region has a low luminance.

11. A method for determining a welding mode when laser beam welding is performed, the method comprising:
obtaining an image in an infrared wavelength region and an image in a short wavelength region of visible light from a laser irradiation area and its vicinity;
extracting a light emitting image from the image in the infrared wavelength region and a light emitting image from the image in the short wavelength region of visible light; and
determining the welding mode when the laser beam welding is performed by comparing the light emitting image of the image in the infrared wavelength region and the light emitting image of the image in the short wavelength region of visible light,
wherein the comparison of the light emitting image of the image in the infrared wavelength region and the light emitting image of the image in the short wavelength region of visible light includes at least one of:
comparing the light emitting image of the image in the infrared wavelength region and the light emitting image of the image in the short wavelength region of visible light in size, and
comparing the light emitting image of the image in the infrared wavelength region and the light emitting image of the image in the short wavelength region of visible light in luminance,
wherein:
the size comparison includes calculating a size difference of the light emitting image of the image in the infrared wavelength region and the light emitting image of the image in the short wavelength region of visible light, and
the luminance comparison includes calculating a luminance difference of the light emitting image of the image in the infrared wavelength region and the light emitting image of the image in the short wavelength region of visible light,
the welding mode determination device further comprising:
a first determination list used to determine the welding mode based on the size difference; and
a second determination list used to determine the welding mode based on the luminance difference,
wherein the determination unit refers to at least one of the first determination list and the second determination list to determine the welding mode.

12. A laser beam welding device that is capable of changing an energy intensity of a laser beam that irradiates a laser irradiation area when performing laser beam welding, the laser beam welding device comprising:
an obtaining unit that obtains an image in an infrared wavelength region and an image in a short wavelength region of visible light from the laser irradiation area and its vicinity;
an extraction unit that extracts a light emitting image from the image in the infrared wavelength region and a light emitting image from the image in the short wavelength region of visible light; and
a controller that controls the energy intensity of the laser beam by comparing the light emitting image of the image in the infrared wavelength region and the light emitting image of the image in the short wavelength region of visible light,
wherein the comparison of the light emitting image of the image in the infrared wavelength region and the light emitting image of the image in the short wavelength region of visible light includes at least one of:
comparing the light emitting image of the image in the infrared wavelength region and the light emitting image of the image in the short wavelength region of visible light in size, and
comparing the light emitting image of the image in the infrared wavelength region and the light emitting image of the image in the short wavelength region of visible light in luminance,
wherein:
the size comparison includes calculating a size difference of the light emitting image of the image in the infrared wavelength region and the light emitting image of the image in the short wavelength region of visible light, and
the luminance comparison includes calculating a luminance difference of the light emitting image of the image in the infrared wavelength region and the light emitting image of the image in the short wavelength region of visible light,
the welding mode determination device further comprising:
a first determination list used to determine the welding mode based on the size difference; and
a second determination list used to determine the welding mode based on the luminance difference,
wherein the determination unit refers to at least one of the first determination list and the second determination list to determine the welding mode.

13. The laser beam welding device according to claim 12, wherein the control of the energy intensity includes controlling at least one of an area that is irradiated with the laser beam and a traveling speed of the laser beam.

14. A method for determining a welding mode when laser beam welding is performed, the method comprising:
obtaining an image in an infrared wavelength region and an image in a short wavelength region of visible light from a laser irradiation area and its vicinity;
extracting a light emitting image from the image in the infrared wavelength region and a light emitting image from the image in the short wavelength region of visible light; and
determining the welding mode when the laser beam welding is performed by comparing the light emitting image of the image in the infrared wavelength region and the light emitting image of the image in the short wavelength region of visible light
wherein the comparison of the light emitting image of the image in the infrared wavelength region and the light emitting image of the image in the short wavelength region of visible light includes at least one of:
comparing the light emitting image of the image in the infrared wavelength region and the light emitting image of the image in the short wavelength region of visible light in size, and
comparing the light emitting image of the image in the infrared wavelength region and the light emitting image of the image in the short wavelength region of visible light in luminance, wherein:
the luminance comparison includes determining a combination of luminance of the light emitting image of the image in the infrared wavelength region and luminance of the light emitting image of the image in the short wavelength region of visible light, and
the determination unit determines the welding mode in accordance with the combination of the luminance of the light emitting image of the image in the infrared wavelength region and the luminance of the light emitting image of the image in the short wavelength region of visible light.

15. A laser beam welding device that is capable of changing an energy intensity of a laser beam that irradiates a laser irradiation area when performing laser beam welding, the laser beam welding device comprising:
an obtaining unit that obtains an image in an infrared wavelength region and an image in a short wavelength region of visible light from the laser irradiation area and its vicinity;
an extraction unit that extracts a light emitting image from the image in the infrared wavelength region and a light emitting image from the image in the short wavelength region of visible light; and
a controller that controls the energy intensity of the laser beam by comparing the light emitting image of the image in the infrared wavelength region and the light emitting image of the image in the short wavelength region of visible light
wherein the comparison of the light emitting image of the image in the infrared wavelength region and the light emitting image of the image in the short wavelength region of visible light includes at least one of:
comparing the light emitting image of the image in the infrared wavelength region and the light emitting image of the image in the short wavelength region of visible light in size, and
comparing the light emitting image of the image in the infrared wavelength region and the light emitting image of the image in the short wavelength region of visible light in luminance,
wherein:
the luminance comparison includes determining a combination of luminance of the light emitting image of the image in the infrared wavelength region and luminance of the light emitting image of the image in the short wavelength region of visible light, and
the determination unit determines the welding mode in accordance with the combination of the luminance of the light emitting image of the image in the infrared wavelength region and the luminance of the light emitting image of the image in the short wavelength region of visible light.

* * * * *